United States Patent [19]
Carter et al.

[11] 4,104,193
[45] Aug. 1, 1978

[54] IMPARTING SUPERIOR VISCOSITY TO AQUEOUS POLYSACCHARIDE SOLUTIONS

[75] Inventors: Walter H. Carter, Houston; Charles A. Christopher, Stafford; Thomas Jefferson, Houston, all of Tex.

[73] Assignee: Texaco Inc., New York, N.Y.

[21] Appl. No.: 722,976

[22] Filed: Sep. 13, 1976

[51] Int. Cl.² ............... E21B 33/138; E21B 43/22
[52] U.S. Cl. ............................. 252/316; 166/246; 252/8.55 D
[58] Field of Search ............... 166/246; 252/8.55 R, 252/8.55 D, 316

[56] References Cited
U.S. PATENT DOCUMENTS

| | | | |
|---|---|---|---|
| 3,198,268 | 8/1965 | Lindblom | 166/246 X |
| 3,373,810 | 3/1968 | Williams | 166/246 |
| 3,625,889 | 12/1971 | Branscum | 166/246 X |
| 3,801,502 | 4/1974 | Hitzman | 252/316 X |
| 3,908,760 | 9/1975 | Clampitt | 166/246 |

Primary Examiner—Sidney Marantz
Attorney, Agent, or Firm—Carl G. Ries; Thomas H. Whaley; Kenneth R. Priem

[57] ABSTRACT

Method for imparting superior viscosity to an aqueous polysaccharide solution comprises prehydrating polysaccharide in fresh and deionized water. The viscosity imparted to the final aqueous solution by this method is greater than the viscosity of an aqueous polysaccharide solution initially hydrated in hard water. Alternatively, the polysaccharide solution in fresh water may be used alone or diluted with water containing inorganic ions.

8 Claims, 3 Drawing Figures

× 1ST. METHOD      △ 2ND. METHOD

⬡ 1,000 g/m³ (1ST. METHOD)   ◇ 1,000 g/m³ (2ND. METHOD)
▢ 500 g/m³ (1ST. METHOD)     △ 500 g/m³ (2ND. METHOD)

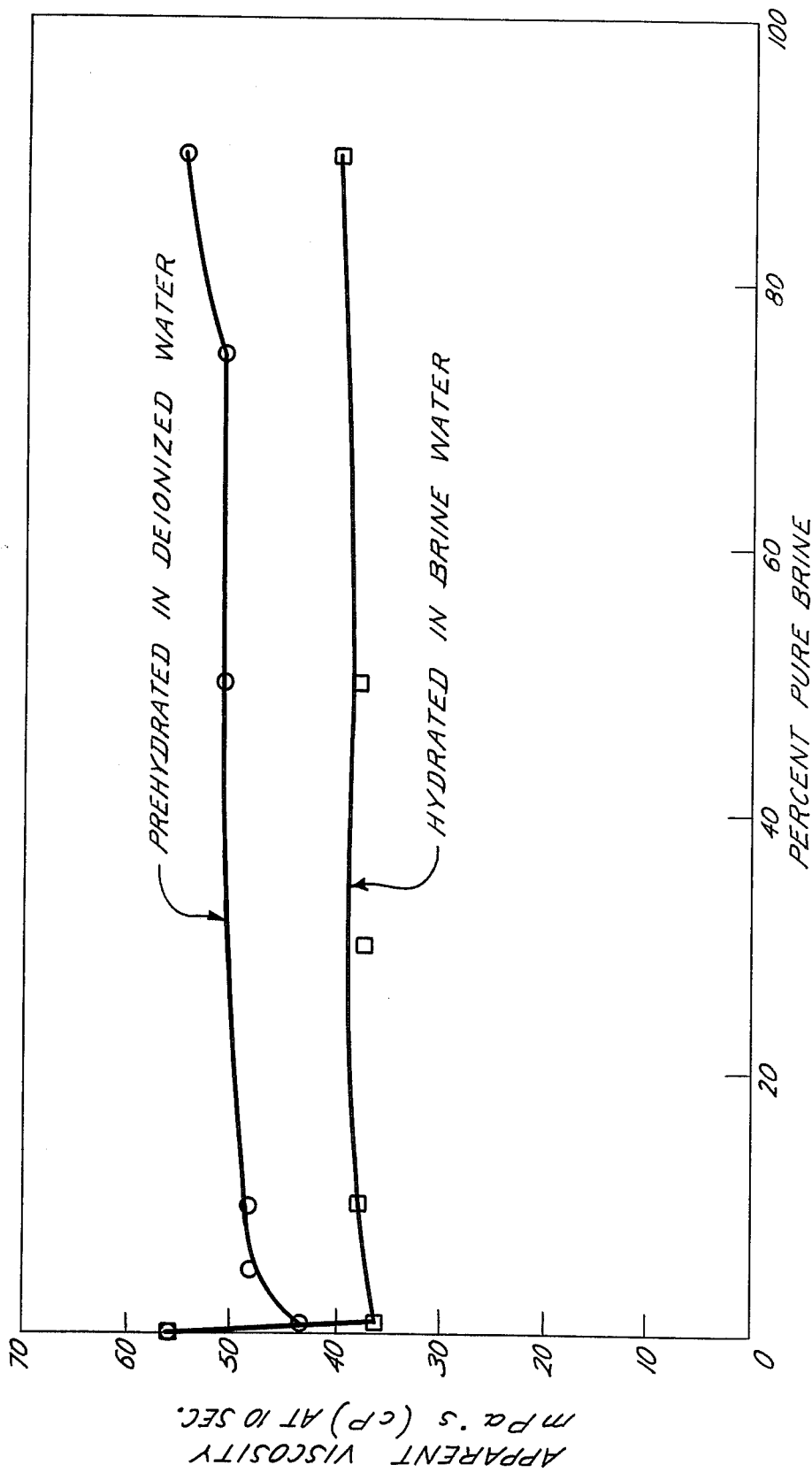

IMPARTING SUPERIOR VISCOSITY TO AQUEOUS POLYSACCHARIDE SOLUTIONS

BACKGROUND OF THE INVENTION

The present invention relates to the preparation of aqueous solutions of polysaccharide.

The preparation of an aqueous solution of polysaccharide into a viscous solution is generally well known in the art. It is desirable when preparing an aqueous solution of polysaccharide to be able to control the ultimate viscosity of the solution and particularly desirable to be able to increase the viscosity of the solution without using additional polysaccharide. A typical use of polysaccharide solutions is in a water flood operation to recover oil from subterranean reservoirs. These processes are well known in the petroleum production art. Aqueous polysaccharide solutions are injected to follow an aqueous flooding medium, for example; water, surfactant or other recovery agents to drive oil in the reservoir to one or more production wells where oil is produced. The tendency of injected water to channel through the sweeping medium and completely bypass portions of the reservoir is a well known problem. The problem has been overcome by the use of viscous solutions of polymers such as polysaccharide.

Researchers and practioners of the art have taught that a polysaccharide solution may be prepared in water containing a high content of inorganic ions. Since most of the water in an oil field contains a considerable amount of inorganic ions it is convenient to add the polysaccharide directly to the brine water to be used in the recovery operation. This, of course, leads to a viscous aqueous solution but the viscosity is not always as high as is desired using the amount of polysaccharide necessary for an economical recovery operation. It has been surprisingly discovered that the viscosity of the aqueous brine solution of polysaccharide can be increased dramatically without additional polysaccharide by the method to be disclosed herein.

SUMMARY OF THE INVENTION

The invention is a method for imparting superior viscosity to an aqueous polysaccharide solution wherein the aqueous component is hard water. The method comprises prehydrating the polysaccharide in fresh or deionized water before mixing with an aqueous component of hard water. The invention also encompasses the use of polysaccharide solutions in soft water. By using the method of this invention the polysaccharide solution will attain a much higher viscosity than an equivalent polysaccharide solution initially hydrated in hard water.

BRIEF DESCRIPTION OF THE DRAWING

FIG. 3 demonstrates the improvement of the invention over hydration in various percentages of brine.

DESCRIPTION OF THE PREFERRED EMBODIMENTS

Figure 1:
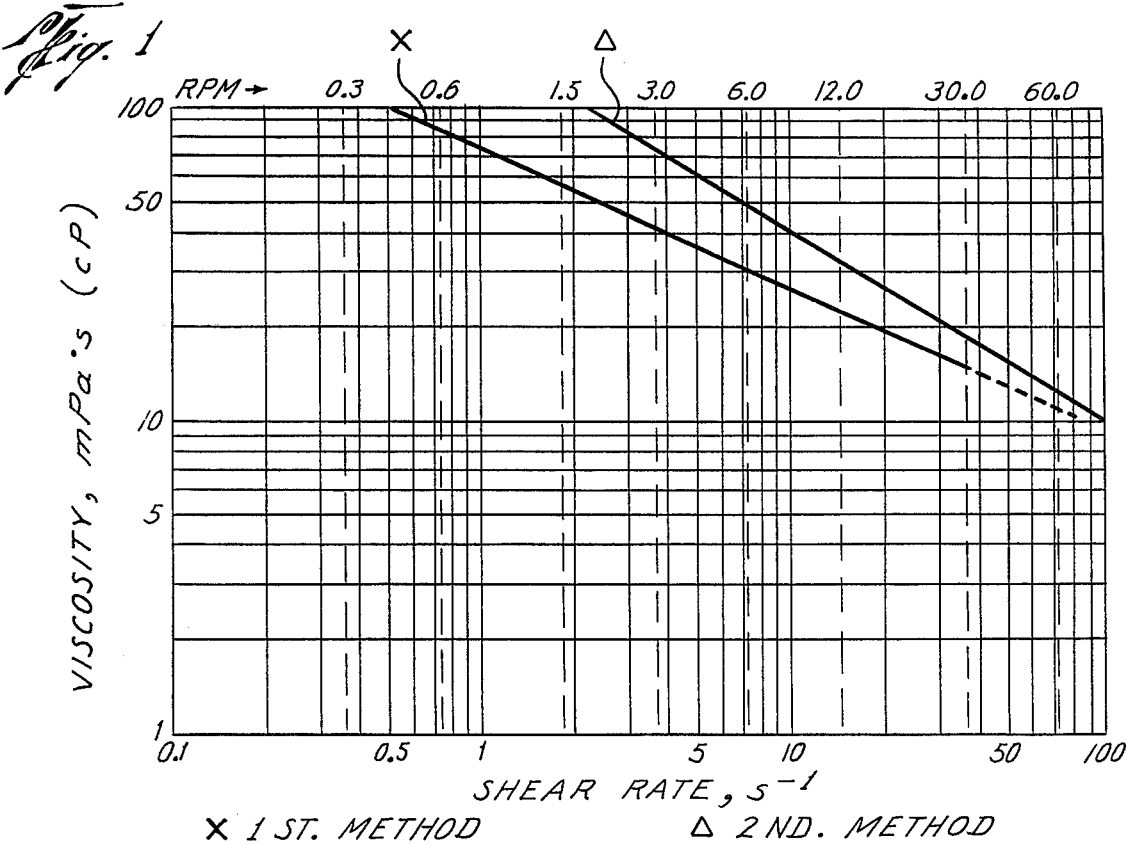
FIG. 1 depicts the invention performed in Manvel brine water.

In the present invention an aqueous polysaccharide solution may be prepared which has superior viscosity to the known methods of preparing aqueous polysaccharide solutions. The critical step in this invention is to prehydrate a polysaccharide with comparatively fresh water. It has been surprisingly discovered that this prehydration step with comparatively fresh water imparts an improved viscosity to a polysaccharide solution whether or not the polysaccharide solution is later mixed with relatively hard water or with additional soft water. In a preferred embodiment the prehydrated polysaccharide is mixed with hard water.

The polymer to be used in the present invention is polysaccharide as defined below. It is surprising that other polysaccharides and other common polymers such as polyacrylamide do not show an improvement in viscosity when prehydrated in relatively fresh water.

The polysaccharide preferred in this inveniton is an ionic polysaccharide selected from the group of heteropolysaccharides prepared by employing the bacteria of the genus Xanthomonas. Of these heteropolysaccharides the polysaccharide B-1459 is preferred and is used in the Examples in this application to illustrate the invention. Polysaccharide B-1459 contains d-glucose, d-mannose, and d-glucuronic acid groups in the ratio to 2.8:3.0:2.0. It also contains about 3 to about 3.5 percent by weight pyruvic acid and about 4.7 percent by weight of acetic acid. The acetic acid exists as the O-acetyl ester, whereas the pyruvic acid is attached through a ketal linkage. The polysaccharide B-1459 is produced by culturing bacterium *Xanthomonas campestris* NRRL B-1459 United States Department of Agriculture, on a wellaerated medium having a pH of about 7 containing commercial glucose, organic nitrogen sources, dipotassium hydrogen phosphate, and appropriate trace elements. The preferred fermentation temperature during the culturing is about 28° C. The fermentation reaction is complete in about 96 hours or less. Bacterial cells and suspended impurities are removed from the fermentation product by centrifugation after adjusting the pH to from 5 to 6. The polysaccharide B-1459 is precipitated from the centrifuged fermentation product by adding salt and a low molecular weight alcohol thereto.

The polysaccharide B-1459 is now a relatively standard product. Its molecular weight is estimated to be in the millions. This polysaccharide is commercially available under the trade name "Xanflood" from the "Xanco" Company, San Diego 92123. It was formerly called "Kelzan."

The terms fresh water and hard water as used herein are by their nature inprecise and useful only to simplify the explanation of the invention. The definition of these terms depend on the specific situation encountered. In our invention polysaccharide B-1459 is first prehydrated in fresh water, and then this prehydrated product is mixed with hard water to form a solution of polysaccharide having superior viscosity compared with the same amount of polysaccharide initially hydrated in hard water. Laboratory studies (See Example VIII) have shown that this method works best when the fresh water prehyration step is done in water containing below about 15,000 of total inorganic ions (cations and anions) including monovalent and divalent ions typically $Na^+$, $Ca^{++}$ and/or $Mg^{++}$. Therefore, fresh water is water which will prehydrate the polysaccharide to yield a polysaccharide solution in hard water of higher viscosity than hydrating directly in hard water. Deionized water contains no appreciable inorganic ions. Hard water or brine as used herein is water having these inorganic ions present in amount well above what is considered fresh water, for example, about 20,000 g/m³. Since it is clear that experimentors armed with the basic teachings of this disclosure may find variation from brine to brine using the same principles, these values are not intended to limit the scope of the invention but are included for disclosing the full amount of information which present data teaches.

It is also an advantage of our invention that the solution of polysaccharide B-1459 which has been prehydrated with fresh water flows more readily in a porous media such as a subterranean hydrocarbon reservoir matrix than does a solution of polysaccharide hydrated initially in brine which often plugs the porous media.

EXPERIMENTAL

The following data will demonstrate that the method of this invention imparts superior viscosity to polysaccharide solutions. The data will also indicate that the same method applied to other polysaccharides and to polyacrylamide solutions does not improve the viscosity characteristics.

EXAMPLE I

This example demonstrates the method of this invention. Solutions of 1.0 Kg/m$^3$ polysaccharide B-1459 were prepared in Manvel brine by two methods. The first method consisted of hydrating polysaccharides directly in Manvel brine. The second method consisted of prehydrating polysaccharide in deionized water and then diluting with Manvel brine.

The first method comprised adding 0.5 grams of polysaccharide to 500 cubic centimeters of Manvel brine being stirred in a Waring blender for about 30 minutes. The resulting solution's viscosity profile is presented in FIG. 1.

The second method comprised prehydrating 5.0 grams of polysaccharide in 500 cubic centimeters of deionized water. A 50 gram aliquot was diluted with 450 cubic centimeters of Manvel brine containing about 106,000 g/m$^3$ of total dissolved inorganic ions including 38,900 g/m$^3$ of Na$^+$, 1810 g/m$^3$ of Ca$^{++}$ and 612 g/m$^3$ of Mg$^{++}$. and placed in a container. This container was shaken twenty-five times to simulate the action of an inline static mixer. This solution's viscosity profile is presented in FIG. 1 also.

It may be concluded from FIG. 1 that both methods produced homogeneous solutions containing no conglomerate particles of polysaccharide. However, the highest viscosity was obtained from the prehydrated polysaccharide in deionized water (second method).

EXAMPLE II

In this example polysaccharide B-1459 was ultimately made into solution with Walpole brine. Walpole Brine has the following amounts of dissolved inorganic ions: Na$^+$ = 38,157, g/m$^3$; Ca$^{++}$ = 4,700, g/m$^3$; and Mg$^{++}$ = 1,480, g/m$^3$ with about 116,000 g/m$^3$ of total dissolved inorganic ions. Two methods were used to prepare polysaccharide solutions of 1000 gm/m$^3$ and 500 gm/m$^3$ of polysaccharide.

The first method comprised adding 0.6 grams and 0.3 grams of polysaccharide to two 600 ml. solutions of Walpole brine being stirred in a Waring blender.

Figure 2:
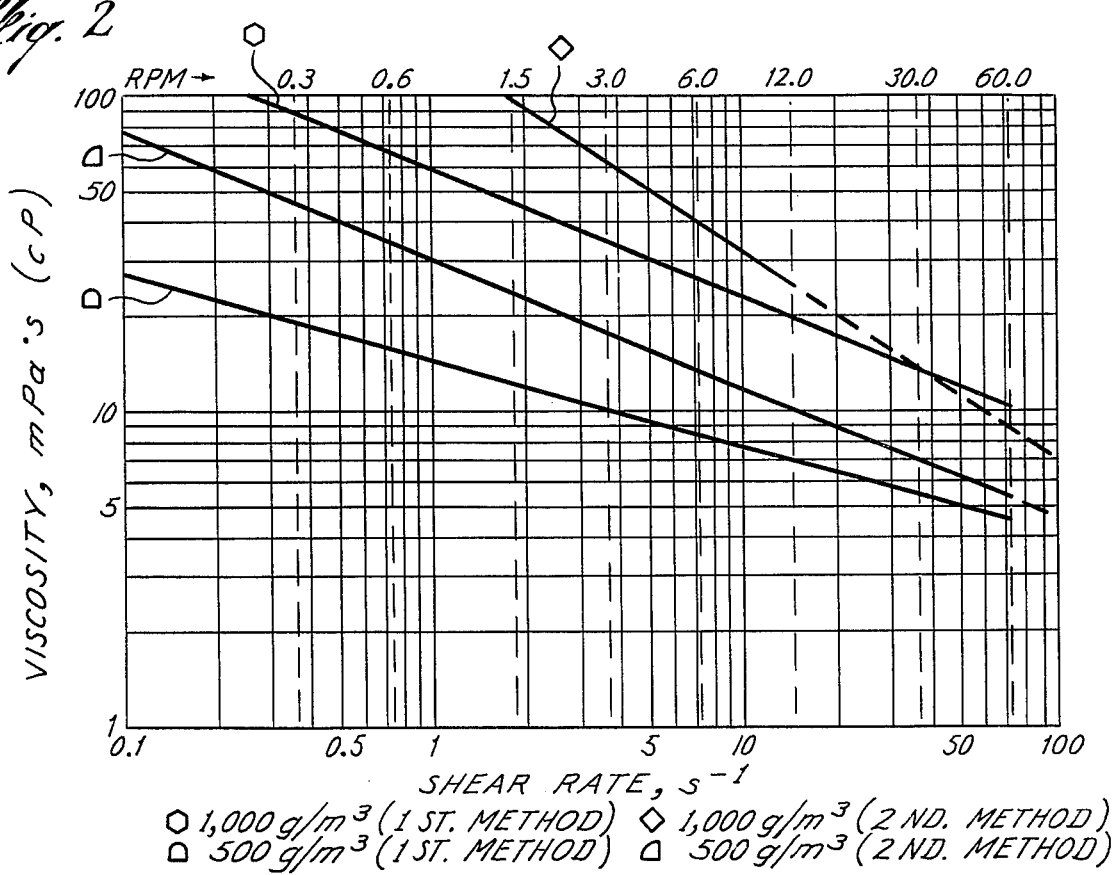
FIG. 2 depicts the invention performed in Walpole brine water.

The second method comprised prehydrating 5.0 grams of polysaccharide in 500 cubic centimeters of deionized water. A 40 gram and 20 gram aliquot was diluted with 360 and 380 cubic centimeters respectively of Walpole brine and placed in a container. This container was shaken twenty-five times to simulate the action of a static mixer. The solution viscosities are depicted on FIG. 2. Both methods produced homogeneous solutions. However, the prehydration of polysaccharide with deionized water (second method) is obviously the optimum method to yield the highest viscosity in the ultimate aqueous solution.

EXAMPLE III

Example III depicts the effects of various salt concentrations on the viscosities of polysaccharide B-1459 solutions which have been prehyrdated in deionized water and those hydrated initially in hard water containing high concentrations of inorganic ions. The pure brine in this Example has about 203,000 and g/m$^3$ of dissolved inorganic ions including about 68,000 g/m$^3$ of Na$^+$, 9,120 g/m$^3$ of Ca$^{++}$ and 1,390 g/m$^3$ of Mg$^{++}$. As may be seen from FIG. 3 the viscosity of the deionized water prehydrated polysaccharide display higher viscosities than those hydrated directly in the various concentrations of brine.

EXAMPLE IV

This example shows that the method of the invention does not work with polyacrylamide polymer. In this experiment solutions of polyacrylamide were prepared in deionized and in fresh water as well as in brine containing a high concentration of inorganic ions. After these solutions were prepared the viscosity was measured and recorded. Table I gives the results of these experiments.

The deionized water contained no appreciable inorganic salts. The fresh water contained 500 g/m$^3$ NaCl and 400 g/m$^3$ CaCl$_2$.2H$_2$O. The brine contain 100,000 g/m$^3$ NaCl and 15,000 g/m$^3$ CaCl$_2$.2H$_2$O.

TABLE I

| | | Viscosity, (Units) |
|---|---|---|
| A) | Prehydrated indeionized water then diluted with brine. | 6.8 |
| B) | Prehydrated with fresh water then diluted with brine. | 6.8 |
| C) | Hydrated directly in an 80/20 mixture of brine and fresh water. | 6.7 |
| D) | Hydrated directly in 100% brine. | 6.7 |

EXAMPLE V

Two polysaccharides other than B-1459 were prehydrated in deionized water and then mixed with brine (hard) water. Those polysaccharides, guargum and hydroxyethylcellulose, did not show an improvement in viscosity compared to other solutions of those materials prepared by initially hydrating them in brine (hard) water.

EXAMPLE VI

This example illustrates that time of hydration of polysaccharide B-1459 does not play a significant role in the viscosity of the final solution but that prehydration in fresh water is the key to higher viscosity.

| | VISCOSITY IN mPa-s(cp), 10 s$^{-1}$ | |
|---|---|---|
| DAYS | B-1459 HYDRATED DIRECTLY IN BRINE | PREHYDRATED B-1459 IN FRESH WATER* PRIOR TO ADDITION OF BRINE |
| 1 | 24 | 42 |
| 29 | 24 | 42 |
| 515 | 24 | 35 |

*Contains 130 g/m$^3$ of inorganic ions

EXAMPLE VII

A linear limestone core having a length of 17.7 cm and a diameter of 5.08 cm, a permeability of 98.5 md and an original oil saturation (So) of about 0.68 was first water flooded to an oil saturation (Sow) of 0.334. Then the core was flooded with an aqueous solution containing surfactants and sodium lignosulfonate. This solution was followed by an aqueous brine solution of 1000 g/m$^3$ of polysaccharide B-1459 which had been prepared by prehydrating the polysaccharide in fresh water and then mixing it with brine containing about 82,000 g/m$^3$ total dissolved inorganic ions including about 20,300 g/m$^3$ of Na$^+$, 6,649 g/m$^3$ of Ca$^{++}$ and 2,530 g/m$^3$ of Mg$^{++}$.

The final oil saturation in the core (Sor) was 0.143. Therefore, the tertiary system using the polysaccharide solution produced 57% of the oil in place (OIP) after the water flood.

EXAMPLE VIII

The following data shows the effect of prehydration with water containing varying amounts of inorganic ions. The polysaccharide B-1459 was prehydrated in each of the aqueous solution containing from zero to 55,500 g/m$^3$ of inorganic ions. The prehydrated concentrate was the mixed with pure brine containing 111,000 g/m$^3$ of dissolved inorganic ions with a Ca$^{++}$/Na$^+$ ratio of 1 to 9.

| PREHYDRATION WATER | | FINAL VISCOSITY IN BRINE |
|---|---|---|
| 0.0 | g/m$^3$ inorganic ions | 49.0 |
| 555 | g/m$^3$ inorganic ions | 45.5 |
| 1,100 | g/m$^3$ inorganic ions | 45.0 |
| 5,550 | g/m$^3$ inorganic ions | 42.0 |
| 11,000 | g/m$^3$ inorganic ions | 39.5 |
| 55,500 | g/m$^3$ inorganic ions | 35.0 |
| 111,000* | g/m$^3$ inorganic ions | 35.0 |

EXAMPLE IX

To illustrate that a brine solution of polysaccharide B-1459 prehydrated in deionized water flows more readily through a porous media that a solution of polysaccharide hydrated directly in brine the following experiment was performed.

Two polymer solutions of polysaccharide B-1459 at 1000 g/m$^3$ were filtered through a nuclepore filter medium 5.0 pore size at 20 psi pressure differential. This test provides a relative measure of the fluid injectivity. One polymer solution was prehydrated in deionized water and the other was hydrated directly in the same brine containing 111,000 g/m$^3$ of dissolved inorganic ions.

The prehydrated polymer solution passed through the filter medium much more readily. For example after 80 seconds the polymer solution hydrated directly in brine was almost plugged having passed only 50 cm$^3$ of liquid through the filter. It ultimately only passed about 60 cm$^3$ before completely plugging. At 80 seconds the prehydrated polymer solution had passed 160 cm$^3$ and ultimately passed 180 cm$^3$.

I claim:

1. A method for imparting superior viscosity to an aqueous polysaccharide B-1459 solution wherein the aqueous component is hard water consisting of
   prehydrating the polysaccharide in fresh water before mixing with hard water.

2. A method as in claim 1 wherein the fresh water contains inorganic ions below about 15,000 g/m$^3$.

3. A method as in claim 1 wherein the fresh water contains inorganic ions below about 6,000 g/m$^3$.

4. A method for imparting superior viscosity to an aqueous polysaccharide B-1459 solution consisting of
   prehydrating the polysaccharide in fresh water and mixing the prehydrated polysaccharide solution with hard water.

5. A method as in claim 4 wherein the final solution of polysaccharide has an aqueous component which is hard water.

6. A method as in claim 5 wherein the hard water has an inorganic ion content of 50,000 g/m$^3$ or more.

7. A method of imparting superior viscosity to an aqueous polysaccharide B-1459 solution wherein the aqueous component is hard water consisting of
   prehydrating the polysaccharide in deionized water before mixing with hard water.

8. A method for imparting superior viscosity to an aqueous polysaccharide B-1459 solution consisting of
   prehydrating the polysaccharide in deionized water and
   mixing the prehydrated polysaccharide solution with hard water.

* * * * *

Notice of Adverse Decision in Interference

In Interference No. 100,490, involving Patent No. 4,104,193, W. H. Carter, C. A. Christopher and T. Jefferson, IMPARTING SUPERIOR VISCOSITY TO AQUEOUS POLYSACCHARIDE SOLUTIONS, final judgment adverse to the patentee was rendered June 20, 1983, as to claims 1–8.

[*Official Gazette November 15, 1983.*]